Jan. 25, 1938.  B. S. AIKMAN  2,106,473
BRAKE AND CLUTCH CONTROL DEVICE
Filed Aug. 29, 1936
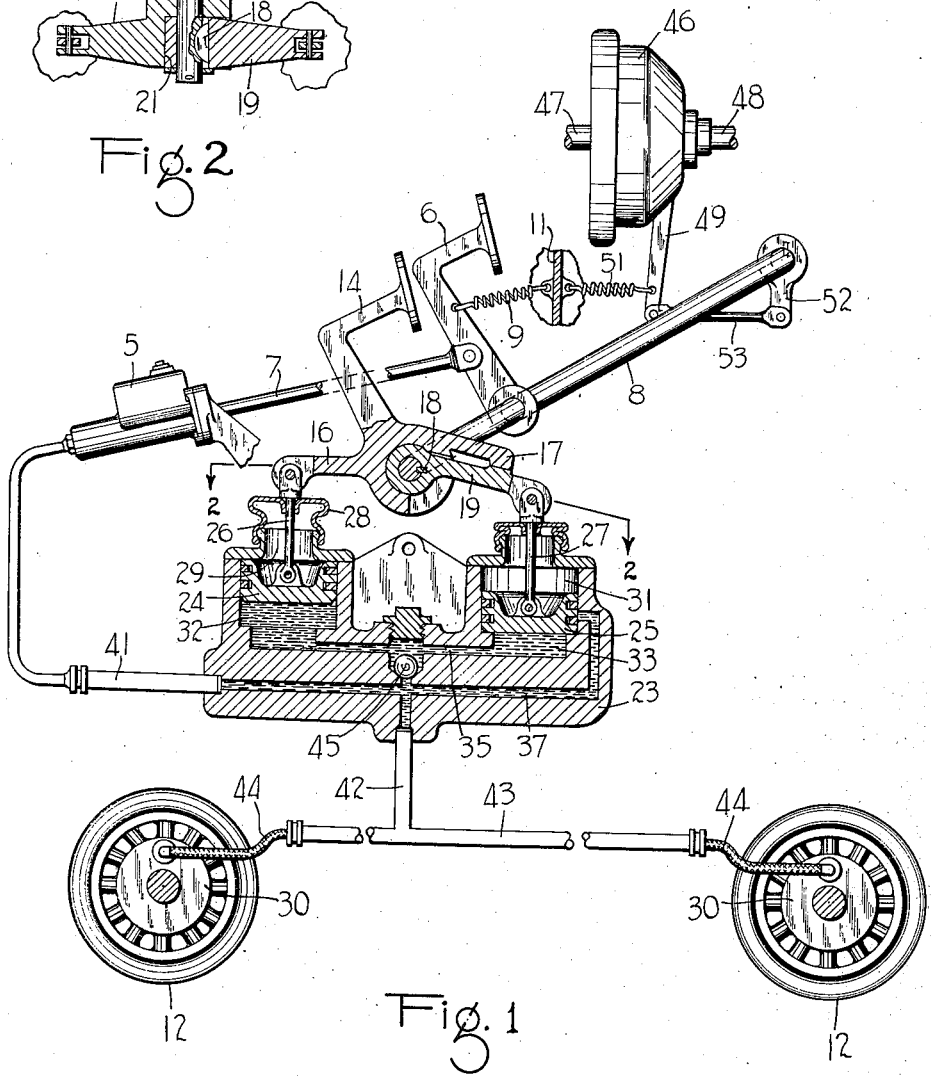
INVENTOR
BURTON S. AIKMAN
BY *Wm. M. Cady*
ATTORNEY Patented Jan. 25, 1938

2,106,473

UNITED STATES PATENT OFFICE 2,106,473

BRAKE AND CLUTCH CONTROL DEVICE

Burton S. Aikman, Wilkinsburg, Pa., assignor to The Westinghouse Air Brake Company, Wilmerding, Pa., a corporation of Pennsylvania Application August 29, 1936, Serial No. 98,517

13 Claims. (Cl. 192—13)

This invention relates to brake and clutch control devices and particularly to brake and clutch control devices for automotive vehicles.

As is well known, the starting of an automobile from a stopped position on an ascending grade requires some degree of skill and experience in order to so effect the engagement of the clutch, the release of the brake and the acceleration of the vehicle engine, that the vehicle does not tend to coast backwardly and cause jerky starting or stalling of the vehicle engine. It is true that by using a hand throttle for the vehicle engine, both feet may be kept free to operate the clutch pedal and the brake pedal. However, even in such a case, skill and experience is nevertheless required in so synchronizing the operation of the brake pedal to release the brakes with the operation of the clutch pedal to engage the clutch, without stalling the vehicle engine.

It is accordingly an object of my invention to obviate the necessity for skill and experience in the brake and clutch control while starting an automobile from a stopped position on an ascending grade.

More specifically, it is an object of my invention to provide means for simply and positively coordinating the usual clutch pedal of an automotive vehicle with the vehicle brake system that operation of the clutch pedal only is required to apply and release the brakes and cause engagement and disengagement of the clutch.

Another object of my invention is to provide means of the character indicated in the foregoing object including means for automatically synchronizing the release of the brakes with engagement of the clutch so that the vehicle does not move backwardly on a grade in starting but moves forward under power without stalling the engine.

The above objects and other objects of my invention, which will be made apparent subsequently, are attained by means of an embodiment of my invention described hereinafter and shown in the accompanying drawing wherein, Fig. 1 is a diagrammatic view showing the essential elements of my invention in connection with a hydraulic brake system;

Fig. 2 is a sectional view, taken on the line 2—2 of Fig. 1 showing a detail of construction, and Fig. 3 is a fragmentary sectional view, showing details of construction of the wheel brake.

Referring to the drawing, I have shown a simple form of hydraulic brake system comprising a pressure cylinder 5, containing a piston, not shown, which is connected to a brake pedal 6 by a tie rod or shaft 7, the pedal 6 being pivoted in any suitable manner on the vehicle, as by journaling at one end on a shaft or rod 8. The pedal 6 is normally yieldingly urged to a raised position by means of a spring 9 connected at one end to the pedal 6 and at the opposite end to a part of the vehicle structure 11.

When the brake pedal 6 is depressed against the force of the spring 9, the piston in the pressure cylinder 5 applies pressure to the liquid medium in the hydraulic system and accordingly to the pressure operated abutments or pistons 10 which actuate the brake shoes 20 into frictional engagement with the brake drum 30. (See Fig. 3.) Since hydraulic brake mechanisms associated with vehicle wheels are well known, a detailed showing of such structure is omitted. It should be understood, moreover, that the structure represented in the drawing is merely illustrative of any suitable type of wheel brake.

According to my invention, I provide a clutch pedal 14 provided with a hub portion 15 through which shaft 8 extends, the pedal 14 being rotatable on and relative to the shaft 6. Projecting on opposite sides of the hub 15 are a pair of arms 16 and 17 respectively.

Fixed to the end of the shaft 8, as by a key 18, is an arm 19 which fits into a recess 21 in the hub 15 of the clutch pedal 14 and which is in alignment with and engaged by the arm 17. Contained in a casing 23 are a pair of movable abutments 24 and 25, shown in the form of pistons, which are connected, respectively, by suitable connecting rods 26 and 27, to the outer ends of the projecting arms 16 and 19.

Suitable flexible packing cups 28 surrounding the connecting rods 26 and 27 and secured to the casing 23 serve to prevent the entrance of dust or dirt particles into the chamber 29 at one side of the piston 24 and the chamber 31 at one side of the piston 25, while at the same time permitting free movement of the connecting rods 26 and 27 relative to the casing 23.

On the side of the piston 24 opposite to the chamber 29 is a chamber 32 which is connected through a passage 35 to a similar chamber 33 at the corresponding side of the piston 25, a suitable liquid medium being contained in the chambers 32 and 33 and passage 35.

The casing 23 also contains a passage 37 which opens at one end into the chamber 33 and which is connected at the opposite end to the pressure side of the pressure cylinder 5 through a pipe and conduit 41. The passage 37 is also connected through a branch passage and pipe 42, a pipe 43 and suitable flexible conduits 44 to the pressure cylinders which contain the brake shoe actuating pistons 10.

A suitable non-return or check valve 45, shown as of the ball type, is interposed between the passage 35 and the passage 37 and is effective to seat and thereby prevent the flow of fluid under pressure therepast from the passage 35 to the passage 37, and also to unseat to cause equalization of pressure in passage 37 with that in passage 35 and chambers 32 and 33 when the pressure in passage 37 is the higher.

A suitable clutch device 46 is provided for transmitting the power for driving the vehicle, the clutch being shown for the sake of simplicity as effecting a driving connection between a driving shaft 47 and a driven shaft 48. The engagement or clutching and the disengagement or unclutching of the clutch device 46 to connect the shaft 47 to and disconnect it from shaft 48, respectively, is effected by means of an operating lever 49 which is normally biased in the left-hand direction, as viewed in Fig. 1, by a spring 51, to effect engagement of the clutch device. The end of the lever arm 49 is connected by means of a connecting or tie rod 53 to a lever arm 52 which is suitably secured or fixed to the shaft 8 so that upon rotation of the shaft 8 in a counterclockwise direction, as viewed from the nearest end of the shaft 8 in Fig. 1, the lever arm 49 is actuated in the right-hand direction, against the yielding resistance of the spring 51 as well as that of the usual biasing springs, not shown, within the clutch device, to effect disengagement of the cooperating frictional parts of the clutch device 46.

In operation, the brakes associated with the vehicle wheels 12 may be applied in the usual well known manner by depressing the brake pedal 6, the degree of the brake application being dependent upon the degree of pressure applied by the foot of the operator to the pedal 6.

Disengagement of the clutch device 46 is effected by depressing the clutch pedal 14. It will be apparent that when the clutch pedal 14 is depressed, the piston 24 applies pressure to the liquid medium in the chamber 32 which transmits pressure to the pressure face of the piston 25 in the chamber 33. Piston 25 thus moves upwardly and rotates the lever arm 19 in a counterclockwise direction, as viewed in Fig. 1, so that the engagement of the lever arm 19 with the projecting arm 17 on the clutch pedal 14 is maintained and counterclockwise rotation of the shaft 8 is effected just as if the clutch pedal 14 was connected and secured directly to the shaft 8.

Counterclockwise rotation of the shaft 8 causes disengagement of the cooperating frictional elements of the clutch device 46 to interrupt the driving connection from the driving shaft 47 to the driven shaft 48.

The operator depresses the clutch pedal 14 only a limited extent for normal operation so that the piston 25 is not shifted upwardly sufficiently to uncover the opening of the passage 37 into the chamber 33. The check valve 45 prevents the flow of fluid under pressure from the passage 35 to the passage 37 and therefore, for normal operation of the clutch pedal 14, no increase occurs in the pressure of the liquid medium in the passage 37, and consequently in the pressure acting on the pressure operated brake applying means associated with the vehicle wheels 12. For normal operation of the clutch pedal 14 the brakes accordingly are not applied unless the brake pedal 6 is separately operated.

Let it now be assumed that the vehicle is stopped on an ascending grade with the usual parking or emergency brakes, not shown, applied and that the operator desires to start the vehicle up the grade. The operator may accordingly start the vehicle engine after first depressing the clutch pedal 14 to its fullest extent. Depression of pedal 14 to its fullest extent causes the piston 25 to be shifted upwardly to its fullest extent so that it uncovers the opening of the passage 37 into the chamber 33. It will be apparent, therefore, that the clutch device 46 will be disengaged or unclutched and, at the same time, the pressure applied to the liquid medium in the chambers 32 and 33 is transmitted through the passage 37, pipe 43, and flexible conduits 44 to the pressure operated brake applying pistons 10 so that the wheel brakes are applied to hold the vehicle against backward movement. The parking brake may then be released and the right foot of the operator placed on the accelerator pedal, not shown, for the vehicle engine.

After placing the transmission gear in the first or low gear position, the operator may then simultaneously depress the accelerator pedal to accelerate the speed of the driving engine and relieve the pressure on the clutch pedal 14. As the pressure applied to the liquid medium in the chambers 32 and 33 and, consequently, the pressure maintaining the brakes applied on the vehicle wheels 12, is relieved by relief of pressure on the clutch pedal 14, the spring 51 and the biasing springs in the clutch device 46, which were compressed or further tensioned in disengaging the clutch device, act through the lever 49, tie rod 53 and lever arm 52 to cause rotation of the shaft 8 reversely in a clockwise direction. The piston 25 is accordingly actuated downwardly to apply pressure to the liquid medium in the chambers 33 and 32, which pressure acting on the piston 24 shifts it upwardly to return the clutch pedal 14 upwardly. If the piston 25 is returned only partly so that the opening of the passage 37 into the chamber 33 remains wholly or partly uncovered, the pressure applied by the piston 25 to the liquid medium in the chamber 33 remains effective through the passage 37, branch pipe and passage 42, pipe 43 and flexible conduits 44, on the pressure operated brake applying pistons 10.

It will be apparent that the driving and the driven elements of the clutch device 46 will not begin to reengage until after the piston 25 has covered or lapped the opening of the passage 37 into the chamber 33, because as previously explained, the clutch pedal 14 may be depressed to a limited extent without uncovering the opening of the passage 37 into the chamber 33, to effect only disengagement of the driving and driven elements of the clutch device 46.

As the pressure on the clutch pedal 14 continues to be relieved or diminished, the continued application of pressure by the piston 25 to the liquid medium in the chamber 33 causes the piston 24 to shift upwardly to continue to return the clutch pedal 14 toward its normal raised position. As the driving and the driven elements of the clutch device 46 begin to engage in frictional engagement, the force of the biasing springs in the clutch device on the piston 25 begins to diminish and, consequently, the pressure exerted by the piston 25 on the liquid medium in the chamber 33 begins to diminish. Accordingly, as the pressure in the chamber 33, passage 35 and chamber 32 diminishes, the check valve 45 is unseated by the higher pressure maintained on the liquid medium in the flexible conduit 44, pipe 43, branch pipe and passage 42, and passage 37, and fluid under pressure may thus flow past the check valve 45 from passage 37 to passage 35 so that the brake applying pressure is accordingly reduced.

It will thus be seen that as the pressure applied to the clutch pedal 14 is relieved and as the clutch pedal 14 is returned toward its normal raised position, the cooperating driven and driving elements of the clutch device 46 will be returned into frictional engagement synchronously with the release of the hydraulic pressure applying the brakes associated with the vehicle wheels 12.

Thus, assuming that the operator suitably depresses the accelerator pedal to speed up the vehicle engine, the vehicle will immediately move forward without any tendency to move backwardly, since the brakes continue to be applied sufficiently to hold the car against backward movement at the same time that the clutch is being engaged to cause forward movement of the car up the ascending grade.

When the clutch pedal 14 is returned completely to its normal raised position, the force of the springs within the clutch device 46 and causing frictional contact of the driving and driven elements thereof will be completely sustained by the clutch parts and, therefore, piston 25 will no longer be urged downwardly to apply pressure to the liquid medium in the chambers 32 or 33 or in the hydraulic pipe and conduit system for applying the vehicle wheel brakes. Consequently, the brakes will be entirely released and the clutch will be entirely engaged.

Once the vehicle is ascending the grade under power, the transmission gear mechanism may be shifted successively into higher gear ratios or positions in the usual manner after first depressing the clutch pedal 14 a limited extent for disengaging the clutch device 46.

It will be apparent that although the check valve 45 is unseated, when the brakes are applied by depressing the brake pedal 6, the pressure applied to the piston 25 is counterbalanced by the pressure applied to piston 24 and transmitted through the arm 17 on clutch pedal 14 to arm 19 actuated by the piston 25. Movement of piston 25 to cause disengagement of clutch device 46 is accordingly prevented.

It will accordingly be seen that I have provided means which may be adapted in a simple and inexpensive manner to existing brake systems for obviating the necessity for skill and experience in starting an automatic vehicle up an ascending grade from a stopped position on the grade.

It will be understood that various omissions, additions and modifications may be made in the embodiments shown without departing from the spirit of the invention. For example, the principle of my invention may be applied in connection with mechanical brake systems as distinguished from hydraulic braking systems. It is not my intention, therefore, to limit the scope of my invention except as necessitated by the scope of the prior art.

Having now described my invention, what I claim as new and desire to secure by Letters Patent, is:

1. In a brake and clutch control apparatus for an automotive vehicle, means constituting a hydraulic pressure system, a clutch device, fluid pressure operated means for effecting application and release of the brakes, and means responsive to a certain predetermined increase in the pressure in the hydraulic system for effecting only the disengagement of the clutch device and responsive to an increase in pressure in the hydraulic system greater than said certain increase for effecting disengagement of the clutch device and the supply of fluid under pressure to the fluid pressure operated means to cause application of the brakes.

2. In a motor vehicle clutch and brake control apparatus, in combination, a clutch device, manually operated means for operating said clutch device, a movable abutment operated by said means for applying pressure to a body of liquid in a chamber, and valve means for controlling a communication through which liquid is supplied from said chamber to apply the brakes on the vehicle and operated by said manually operated means to open said communication.

3. In a motor vehicle clutch and brake control apparatus, in combination, a clutch device, manually operated means for operating said clutch device, a movable abutment operated by said means for applying pressure to a body of liquid in a chamber, and valve means for controlling a communication through which liquid is supplied from said chamber to apply the brakes on the vehicle and operated by said manually operated means to open said communication, said valve means being operated upon movement of said clutch device toward the clutched position to close said communication.

4. In a motor vehicle clutch and brake control apparatus, in combination, a clutch device, spring means opposing movement of said clutch device from its clutched position, manually operated means for moving said clutch device to its unclutched position against the resistance of said spring means, valve means controlling a communication through which liquid under pressure is supplied to apply the brakes on the vehicle, and a movable abutment operated, upon movement of said manually operated means, to apply pressure to a body of liquid in a chamber and force liquid from said chamber through said communication upon the opening of said communication by operation of said valve means.

5. In a motor vehicle clutch and brake control apparatus, in combination, a clutch device, spring means opposing movement of said clutch device from its clutched position, manually operated means for moving said clutch device to its unclutched position against the resistance of said spring means, valve means controlling a communication through which liquid under pressure is supplied to apply the brakes on the vehicle, and a movable abutment operated, upon movement of said manually operated means, to apply pressure to a body of liquid in a chamber and force liquid from said chamber through said communication upon the opening of said communication by operation of said valve means, said valve means being operated by said spring means to close said communication upon release of pressure applied to said manually operated means.

6. In a motor vehicle clutch and brake control apparatus, in combination, a clutch device, manually operated means for operating said clutch device, a movable abutment operated by said means for applying pressure to a body of liquid in a chamber, valve means for controlling a communication through which liquid is supplied from said chamber to apply the brakes on the vehicle and operated by said manually operated means to open said communication, said valve means being operated upon movement of said clutch device toward the clutched position to close said communication, and means for enabling reduction of the pressure acting to effect application of the brakes with that in the chamber when said valve means closes the said communication.

7. In a motor vehicle clutch and brake control apparatus, in combination, a clutch device, manually operated means for operating said clutch device, a movable abutment operated by said means for applying pressure to a body of liquid in a chamber, valve means for controlling a communication through which liquid is supplied from said chamber to apply the brakes on the vehicle and operated by said manually operated means to open said communication, said valve means being operated upon movement of said clutch device toward the clutched position to close said communication, and non-return valve means actuated in response to a pressure differential between the pressure acting to effect application of the brakes and the pressure in said chamber for enabling reduction of the pressure acting to effect application of the brakes with that in the chamber when the said valve means closes the said communication.

8. In combination, pressure operated means for effecting application and release of the brakes on an automotive vehicle, a clutch device for transmitting the driving power on the vehicle, a hydraulic pressure system on which the pressure operated means operates, manually operative means for increasing the pressure in said system to cause said pressure operated means to operate to effect application of the vehicle brakes, a pair of movable abutments subject to the pressure of said system, one of said abutments being manually operative to increase the pressure in said system, and the other being responsive to an increase in pressure in said system when effected by the manually operative abutment for effecting disengagement of the clutch device, said abutments being so constructed and arranged that when the pressure in the system is increased by operation of the manually operative means, the force exerted on the manually movable abutment opposes and prevents movement of the other abutment to effect disengagement of the clutch device.

9. In combination, a clutch device for transmitting the driving power on an automotive vehicle, a hydraulic pressure system on the vehicle, means responsive to an increase in pressure in said system for effecting an application of the vehicle brakes, means responsive to an increase in pressure in said system for effecting disengagement of said clutch device, a first manually operative means for effecting an increase in pressure in said system, a second manually operative means for also effecting an increase in pressure in said system, and means for preventing response of said means to effect disengagement of the clutch device when the pressure in said system is increased by operation of said first manually operative means.

10. In combination, a clutch device for transmitting the driving power on an automotive vehicle, a hydraulic pressure system on the vehicle, means responsive to an increase in pressure in said system for effecting an application of the vehicle brakes, means responsive to an increase in pressure in said system for effecting disengagement of said clutch device, a first manually operative means for effecting an increase in pressure in said system, a second manually operative means for also effecting an increase in pressure in said system, and means for causing the pressure in the system acting on said second manually operative means to oppose and prevent response of said means to effect disengagement of the clutch device when the said first manually operative means is operated to effect an increase in the pressure in said system.

11. In a brake and clutch control apparatus for an automotive vehicle, means constituting a hydraulic pressure system, a clutch device, fluid pressure operated means for effecting application and release of the brakes, and pressure-responsive means moved in response to an increase in pressure in the hydraulic system for effecting only the unclutching of the clutch device upon a certain initial movement thereof and effective upon further movement thereof to cause fluid under pressure to be supplied to the fluid pressure operated means to effect application of the brakes.

12. In combination, a clutch device for transmitting driving power on an automotive vehicle, fluid pressure operated means for effecting application of the vehicle brakes, a casing having a chamber containing liquid, manually operable means for varying the liquid pressure in said chamber, pressure responsive means actuated upon an increase in the liquid pressure in said chamber at least to a certain pressure to cause disengagement of the clutch device, and means responsive to an increase in the liquid pressure in said chamber to a second certain pressure higher than the first said certain pressure for establishing a communication through which the pressure of the liquid in said chamber is caused to act on the said fluid pressure operated means to effect application of the brakes.

13. In a brake and clutch control apparatus for an automotive vehicle, in combination, a hydraulic pressure system, pressure operated means actuated upon an increase in pressure in said system to effect application of the vehicle brakes, a second hydraulic pressure system, a clutch device through which power is transmitted to drive the vehicle, and means actuated responsively to an increase in pressure in the second hydraulic system effective as long as the pressure in the second system does not increase beyond a certain pressure for causing only disengagement of the clutch device and effective when the pressure in the second system is increased beyond said certain pressure for causing not only the disengagement of the clutch device but also for establishing communication through which the pressure of the second hydraulic system acts through the first hydraulic system to effect application of the brakes.

BURTON S. AIKMAN.